United States Patent
Zhao et al.

(10) Patent No.: US 9,518,157 B2
(45) Date of Patent: Dec. 13, 2016

(54) PREPARATION OF RUBBER COMPOSITION CONTAINING GRAPHITE PLATELETS AND TIRE WITH COMPONENT

(71) Applicant: The Goodyear Tire & Rubber Company, Akron, OH (US)

(72) Inventors: Junling Zhao, Hudson, OH (US); Xiaoping Yang, Streetsboro, OH (US); Carl Trevor Ross Pulford, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 284 days.

(21) Appl. No.: 14/062,099

(22) Filed: Oct. 24, 2013

(65) Prior Publication Data

US 2015/0119495 A1   Apr. 30, 2015

(51) Int. Cl.
   *C08J 3/00* (2006.01)
   *C08J 3/24* (2006.01)
   *C08J 3/21* (2006.01)

(52) U.S. Cl.
   CPC  *C08J 3/24* (2013.01); *C08J 3/212* (2013.01); *C08J 2309/00* (2013.01)

(58) Field of Classification Search
   CPC ........ C08J 3/22; C08J 2309/00; C08J 2409/00
   See application file for complete search history.

(56) References Cited

U.S. PATENT DOCUMENTS

| | | | | |
|---|---|---|---|---|
| 2006/0229404 A1* | 10/2006 | Lechtenboehmer | .......... | 524/495 |
| 2008/0142131 A1* | 6/2008 | Yang | ..................... | B60C 1/0008 152/209.1 |
| 2012/0053300 A1* | 3/2012 | Zhao | ..................... | B60C 1/0016 525/351 |
| 2013/0153102 A1* | 6/2013 | Zhao | ........................ | 152/209.5 |

* cited by examiner

*Primary Examiner* — Hannah Pak
(74) *Attorney, Agent, or Firm* — Henry C. Young, Jr.

(57) ABSTRACT

Preparation of a rubber composition containing a dispersion of aligned exfoliated graphite platelets. Such rubber composition is prepared by a method comprised of a sequential combination of concentrated solvent or dry masterbatching of elastomer and exfoliated graphite platelets, followed by blending the masterbatch (after removing the solvent from the solvent based masterbatch) with additional elastomer(s) and then followed by processing the resulting rubber composition to align the dispersed exfoliated graphite platelets in a substantially parallel relation to each other. Such processing may comprise as least one of extrusion and calendaring the rubber composition. The invention further relates to a tire containing a component comprised of such rubber composition containing a dispersion of aligned exfoliated graphite platelets prepared by the aforesaid method.

3 Claims, No Drawings

PREPARATION OF RUBBER COMPOSITION CONTAINING GRAPHITE PLATELETS AND TIRE WITH COMPONENT

FIELD OF INVENTION

This invention relates to preparation and use of a rubber composition containing a dispersion of aligned exfoliated graphite platelets. Such rubber composition is prepared by a method comprised of a sequential combination of concentrated solvent or dry masterbatching of elastomer and exfoliated graphite platelets, followed by blending the masterbatch (after removing the solvent from the solvent based masterbatch) with additional elastomer(s) and then followed by processing the resulting rubber composition to align the dispersed exfoliated graphite platelets in a substantially parallel relation to each other. Such processing may comprise at least one of extrusion and calendaring the rubber composition. The invention further relates to a tire containing a component comprised of such rubber composition containing a dispersion of aligned exfoliated graphite platelets prepared by the aforesaid method.

BACKGROUND OF THE INVENTION

Various tire components are composed of rubber compositions, particularly rubber compositions which contain particulate reinforcement such as, for example, at least one of rubber reinforcing carbon black and precipitated silica.

Conductive heat transfer can be an important property for many of a tire's rubber components to aid in both transferring heat into the tire as the rubber is being cured at an elevated temperature to thereby promote improved curing of the tire in a shortened period of time and, also, to aid in transferring heat out of a tire which is generated internally within a cured rubber component of the tire as a result of the tire being used to thereby promote improved durability of the tire.

While various additives may be used to promote conductive heat transfer for a rubber composition of a tire component, it a purpose of this invention to evaluate preparation and use of a rubber composition containing a dispersion of graphite platelets for a tire rubber component by first masterbatching a rubber composition with a relatively high concentration of exfoliated graphite platelets by blending the exfoliated graphite platelets in a solvent solution of elastomer (e.g. organic solvent solution of cis 1,4-polyisoprene rubber) or in a dry, or solid, elastomer (e.g. dry, solid cis 1,4-polyisorene rubber).

Carbon may occur in many forms depending somewhat upon its crystallinity and physical configuration. Forms of the carbon may be such as, for example and not intended limiting, diamonds, particulate rubber reinforcing carbon black and graphite. The particulate forms are normally formed, for example, by incomplete combustion of, for example, petroleum or coal products under controlled conditions and particles of the effluent then collected. Rubber reinforcing carbon black is usually in configurations of a composite of carbon particles resembling bunches of grapes. Graphite may sometimes be referred to as being a crystalline allotropic form of carbon which may, for example, be in a shape of powdered, flake, crystal, rod and platelet particles as well as fibers. For this work, use of graphite platelets are to be evaluated. Graphite platelets are understood to be comprised of stacked relatively flat geometric platelet composites (e.g. platelets as stacked individual platelets of composites of hexagonal geometric forms).

The graphite platelets are expected to present little if any, rubber reinforcement quality, as compared to rubber reinforcing carbon black, although it is likely that they generally possess a heat conductive property which may be superior to rubber reinforcing carbon black.

An important aspect of this evaluation is to find, or develop, a way, namely by using a masterbatching method, to provide an adequate dispersion of the graphite platelets within a rubber composition to aid in promoting the aforesaid heat transfer quality for the rubber composition.

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" or "uncured", unless otherwise indicated.

SUMMARY AND PRACTICE OF THE INVENTION

By this invention, a rubber composition containing a dispersion of exfoliated graphite platelets is prepared by use of a graphite platelet masterbatch, or pre-blend.

In accordance with this invention, a method of preparing a sulfur curable rubber composition is comprised of:

(A) preparing a masterbatch (as a pre-blend without rubber reinforcing carbon black or precipitated silica reinforcing filler) by:

(1) blending from about 0.5 to about 30, alternatively about 3 to about 20, parts by weight of exfoliated graphite platelets with an organic solvent solution containing 100 parts by weight of at least one conjugated diene-based elastomer after which the masterbatch is dried by removing the organic solvent; or (2) blending from about 5 to about 60, alternately from about 10 to about 30, parts by weight of exfoliated graphite platelets with 100 parts by weight of at least one conjugated diene-based elastomer (dry mixing, therefore without organic solvent) followed by:

(B) preparing a subsequent sulfur curable rubber composition comprised of blending from about 20 to about 120, alternately from about 30 to about 120, parts by weight of reinforcing filler per 100 parts by weight of conjugated diene-based elastomer comprised of"

(1) rubber reinforcing carbon black, or (2) combination of rubber reinforcing carbon black and precipitated silica (synthetic amorphous precipitated silica) together with a coupling agent for said precipitated silica having a moiety (e.g. alkoxy group) reactive with hydroxyl groups (e.g. silanol groups) on said precipitated silica and another different moiety (e.g. polysulfide group) interactive with said conjugated diene-based elastomer(s).

The said subsequent sulfur curable rubber composition is processed by at least one of extrusion, calendaring and milling to provide a rubber composition containing a dispersion of graphite platelets in a substantially parallel alignment with each other.

Optionally, the method further comprises adding up to about 40, alternately up to about 20, parts by weight at least one additional elastomer in said subsequent sulfur curable rubber composition where said addition elastomer is comprised of the same or different diene-based elastomer(s) contained in said masterbatch.

In further accordance with this invention, a sulfur curable rubber composition is provided as prepared by said method.

In additional accordance with this invention, the sulfur curable rubber composition is provided as a sulfur cured rubber composition.

In further accordance with this invention, a tire is provided having a component comprised of the rubber composition of this invention.

In practice, said graphite platelets are comprised of stacked arrays of graphite platelets.

A significant aspect of this invention is a preparation and use of rubber compositions containing a dispersion of exfoliated graphite platelets by way of introducing the exfoliated graphite platelets into the rubber composition in a form of a masterbatch of elastomer and exfoliated graphite platelets with a later addition of reinforcing filler comprised of rubber reinforcing carbon black or combination or rubber reinforcing carbon black and precipitated silica together with a coupling agent for the precipitated silica, following which the rubber composition is processed by at least one of extrusion, calendaring and milling to align the exfoliated graphite platelets in a substantially parallel relationship with each other.

In practice, various conjugated diene-based elastomers may be used for the rubber composition (for either or both of said pre-blend and subsequent rubber compositions) and tire component such as, for example, polymers and copolymers comprised of at least one monomer comprised of at least one of isoprene and 1,3-butadiene and from styrene copolymerized with at least one of isoprene and 1,3-butadiene.

Representative of such conjugated diene-based elastomers are, for example, comprised of at least one of cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In one aspect, the conjugated diene-based elastomer may be an elastomer such as, for example, styrene/butadiene copolymer containing at least one functional group reactive with hydroxyl groups on a precipitated silica such as, for example, comprised of at least one of siloxy, amine and imine groups.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica aggregates employed in this invention are typically obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 309 (1938), as well as ASTM D5604 for precipitated silica.

The silica may also be typically characterized by having a dibutylphthalate (DBP) absorption value in a range of about 50 to about 400 cc/100 g, and more usually about 100 to about 300 cc/100 g (ASTM D2414).

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

Various coupling agents may be used for the precipitated silica such as for example, a bis(3-triethoxysilylpropyl) polysulfide containing an average of from about 2 to about 4 connecting sulfur atoms in its polysulfidic bridge or organoalkoxymercaptosilane.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing fillers materials such as, for example, the aforementioned rubber reinforcing carbon black and precipitated silica. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may, for example, comprise about 0.5 to about 10 phr, usually about 1 to about 5 phr. Typical amounts of processing aids, if used, may comprise, for example from about 1 to about 50 phr. Such processing aids can include, for example and where appropriate, aromatic, napthenic, and/or paraffinic processing oils. Typical amounts of antioxidants where used may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants, where used, may comprise for example about 1 to 5 phr. Typical amounts of fatty acids, if used, which can include stearic acid and combinations of stearic acid with one or more of palmitic acid oleic acid and may comprise, for example, from about 0.5 to about 3 phr. Typical amounts of zinc oxide may comprise, for example, from about 1 to about 10 phr. Typical amounts of waxes, such as for example microcrystalline waxes, where used, may comprise, for example, from about 1 to about 5 phr. Typical amounts of peptizers, where used, may comprise, for example, from about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents may be used, for example, in an amount ranging from about 0.5 to about 4 phr, or even, in some circumstances, up to about 8 phr.

Sulfur vulcanization accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging, for example, from about 0.5 to about 4, alternately about 0.8 to about 1.5 phr. In another embodiment, combinations of a primary and a secondary accelerator might be used with the secondary accelerator, where used, being usually used in smaller amounts (for example about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used, for example, which are not affected by normal processing temperatures but produce a satisfactory cure at ordinary vulcanization temperatures. Vulcanization retarders might also be used, where desired or appropriate. Suitable types of accelerators that may be used in the present invention may be, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator may be, for example, a guanidine, dithiocarbamate or thiuram compound.

The presence and relative amounts of the above additives are not considered to be an aspect of the present invention, unless otherwise indicated herein, which is more primarily directed to the utilization of functionalized exfoliated graphene platelets in a rubber composition, particularly for tire component.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and reinforcing fillers, including the exfoliated graphene platelets and alternative additional reinforcing fillers such as, for example precipitated silica and rubber reinforcing carbon black mixed in one or more non-productive mix stages. The terms "non-productive" and "productive" mix stages are well known to those having skill in the rubber mixing art.

The following Example is presented to illustrate the invention and is not intended to be limiting. The parts and percentages are by weight unless otherwise designated.

EXAMPLE I

Rubber compositions comprised of cis 1,4-polyisoprene rubber containing a dispersion of exfoliated graphite platelets were prepared by wet and by dry masterbatching (pre-concentrated mixing) the exfoliated graphite platelets with cis 1,4-polyisprene rubber.

For this Example, rubber Samples A through K were prepared.

Control rubber Samples A and G represent dry mixed Control rubber Samples without a dispersion of exfoliated graphite platelets prepared by dry blending cis 1,4-polyisoprene and rubber compounding ingredients, with Control rubber Samples A and G containing 20 and 40 parts by weight rubber reinforcing carbon black, respectively.

(A) Experimental Rubber Samples B Through F

Experimental rubber Samples B through F represent rubber samples prepared by masterbatch mixing the exfoliated graphite platelets in an organic solvent solution of cis 1,4-polyisoprene rubber following which the solvent is removed from the masterbatch by evaporation. The dried masterbatch is then blended with rubber compounding ingredients, as indicated, and the resulting rubber composition sulfur cured.

The general formulations for Control rubber Samples A and G and Experimental rubber Samples B through F are illustrated in the following Table 1 in terms of parts by weight per 100 parts by weight of rubber.

Various physical properties for Control rubber Sample A and Experimental rubber Samples B through F (using wet masterbatch mixing) are illustrated in Table 3.

(B) Experimental Rubber Samples I and J

Experimental rubber Samples I and J represent rubber samples prepared by masterbatch dry mixing (dry masterbatching) the exfoliated graphite platelets with cis 1,4-polyisoprene rubber. The dry masterbatch is then blended with rubber compounding ingredients to include rubber reinforcing carbon black for Experimental rubber Sample J, and the resulting rubber compositions sulfur cured.

The general formulations for Control rubber Sample G and dry masterbatched Experimental rubber Samples I and J, together with wet masterbatched Experimental rubber Samples E and F from Table 1, are illustrated in the following Table 2 in terms of parts by weight per 100 parts by weight of rubber.

Various physical properties for Control rubber Samples A and G and Experimental rubber Samples E, F (wet masterbatching) and, I and J (dry masterbatching) are illustrated in Table 4.

The rubber compositions may be prepared, for example, by mixing the elastomers(s), which may include a masterbatch, without sulfur and sulfur cure accelerators in a first non-productive mixing stage (NP-1) in an internal rubber mixer for about 4 minutes to a temperature of about 160° C. If desired, the rubber mixture may then mixed in a second non-productive mixing stage (NP-2) in an internal rubber mixer for about 4 minutes to a temperature of about 160° C. without adding additional ingredients. The resulting rubber mixture may then mixed in a productive mixing stage (PR) in an internal rubber mixer with sulfur and sulfur cure accelerator(s) for about 2 minutes to a temperature of about 110° C. The rubber composition may then sheeted out and cooled to below 50° C. between each of the non-productive mixing steps and prior to the productive mixing step. Such rubber mixing procedure is well known to those having skill in such art.

TABLE 1

(using wet masterbatch mixing)

| | Parts (phr) |
|---|---|
| Non-Productive Mixing Step (NP1), Mixed to 160° C. | |
| Synthetic cis 1,4-polyisoprene rubber[1] | 100 |
| Masterbatches, synthetic cis 1,4-polyisoprene rubber with exfoliated graphite[2] | 103 to 120 |
| Exfoliated graphite platelets contained in the masterbatches | 0, 3, 5, 10, 15, 20 |
| Carbon black, rubber reinforcing (N205)[3] | 20 or 0 |

TABLE 1-continued (using wet masterbatch mixing)

|  | Parts (phr) |
|---|---|
| Wax, microcrystalline and paraffin | 1.5 |
| Fatty acid[4] | 2 |
| Antioxidant(s) | 3 |
| Zinc oxide | 3 |
| Productive Mixing Step (PR), Mixed to 110° C. | |
| Sulfur | 2.6 |
| Accelerator(s)[5] | 1.4 |

[1]Synthetic cis 1,4-polyisoprene rubber as Natsyn 2200 ™ from The Goodyear Tire & Rubber Company
[2]Pre-blends (masterbatches) of exfoliated graphite platelets and synthetic cis 1,4-polyisoprene as Natsyn 2200™ from The Goodyear Tire & Rubber Company containing, variously, 0, 3, 5, 10, 15 and 20 phr of exfoliated graphite platelets
[3]Rubber reinforcing carbon black as N205, an ASTM designation
[4]Mixture of fatty acids comprised of stearic, palmitic and oleic acids
[5]Sulfenamide and diphenyl guanidine sulfur cure accelerators

TABLE 2

(using dry masterbatch mixing)

|  | Parts (phr) |
|---|---|
| Non-Productive Mixing Step (NP1), Mixed to 160° C. | |
| Synthetic cis 1,4-polyisoprene rubber[1] | 100 |
| Masterbatches, synthetic cis 1,4-polyisoprene rubber with exfoliated graphite[2] | 125 |
| Exfoliated graphite platelets contained in the masterbatches | 25 |
| Carbon black, rubber reinforcing (N205)[3] | 20, 40, 0 |
| Wax, microcrystalline and paraffin | 1.5 |
| Fatty acid[4] | 2 |
| Antioxidant(s) | 3 |
| Zinc oxide | 3 |
| Productive Mixing Step (PR), Mixed to 110° C. | |
| Sulfur | 2.6 |
| Accelerator(s)[5] | 1.4 |

Note:
Ingredients are identified in Table 1

The following Table 3 represents the uncured and cured behavior and various physical properties of the rubber compositions based upon the basic formulation of Table 1, and reported for Control rubber Sample A and Experimental rubber Samples B through F.

TABLE 3

|  | Control (phr) | Experimental (phr) (wet masterbatch mixing) | | | | |
|---|---|---|---|---|---|---|
|  | A | B | C | D | E | F |
| Synthetic cis 1,4-polyisoprene | 100 | 0 | 0 | 0 | 0 | 0 |
| Masterbatches with exfoliated graphite | 0 | 103 | 105 | 110 | 115 | 120 |
| Synthetic cis 1,4-polyisoprene | 0 | 100 | 100 | 100 | 100 | 100 |
| Exfoliated graphite platelets | 0 | 3 | 5 | 10 | 15 | 20 |
| Carbon black (N205) | 20 | 0 | 0 | 0 | 0 | 0 |
| Properties | | | | | | |
| MDR test; 60 minutes at 150° C. | | | | | | |
| Maximum torque (dN-m) | 13.6 | 9.6 | 9.9 | 11.4 | 13.5 | 14.7 |
| Minimum torque (dN-m) | 1.8 | 0.45 | 0.23 | 0.4 | 0.49 | 0.55 |
| T90 (minutes) | 10 | 12.8 | 12.8 | 12.5 | 12.3 | 12 |
| RPA test (Rubber Process Analyzer) at 10% strain, 11 Hertz, 100° C. | | | | | | |
| Storage modulus G' (Pa) | 907 | 613 | 631 | 741 | 849 | 903 |
| Tan delta | 0.048 | 0.023 | 0.028 | 0.04 | 0.05 | 0.061 |
| Stress-strain | | | | | | |
| Tensile strength (MPa) | 21.2 | 10.9 | 9.7 | 14 | 14.6 | 15.3 |
| Elongation at break (%) | 558 | 464 | 499 | 528 | 418 | 490 |
| 100% modulus (MPa) | 1.5 | 1.4 | 1.5 | 2.2 | 3.1 | 3.8 |
| 300% modulus, ring, (MPa) | 6.4 | 3 | 2.9 | 4 | 5.3 | 6.4 |
| Thermal conductivity (W/m/K)[1] | 0.2 | 0.24 | 0.29 | 0.47 | 0.63 | 0.8 |

[1]Thermal conductivity was measured by a Hot Disk Thermal Conductivity Analyzer, Hot Disk TPS 2500, with Probe Type 5501. The test was conducted at ambient (23° C.) temperature. The thermal conductivity unit is expressed as Watts/meter/Kelvin degrees temperature.

It can be seen from Table 3 that a small amount of the exfoliated graphite (3 phr in Experimental rubber Sample B beneficially presented a similar thermal conductivity (0.24) as the Control rubber Sample A containing 20 phr of rubber reinforcing carbon black.

It can further be seen from Table 3 that increasing the exfoliated graphite content for rubber Samples C through F also increased the thermal conductivity as well as beneficially increasing tensile strength, tan delta and storage modulus.

It is therefore concluded that preparing dispersed exfoliated graphite platelets in the rubber composition by the wet masterbatching method (controlled pre-concentrated exfoliated graphite platelet mixing in an organic solvent) resulted in a better dispersion of the exfoliated graphite platelets in the rubber composition as evidenced by the resultant better heat conductivity property of the prepared rubber Samples E and F as compared to the dry Control rubber composition of Sample A without pre-concentrated masterbatching of the exfoliated graphite platelets.

The following Table 4 represents the uncured and cured behavior and various physical properties of:

(A) previously reported in Table 3 for Control rubber Sample A, together with wet masterbatch prepared Experimental rubber Samples E and F using the formulation reported in Table 1, and (B) newly reported Control rubber Sample G together with dry masterbatch prepared Experimental rubber Samples I and J using formulation reported in Table 2.

It is therefore concluded that while preparation of the dispersed exfoliated graphite platelets in the rubber composition by the wet masterbatching method (controlled pre-concentrated exfoliated graphite platelet mixing in an organic solvent) resulted in a better dispersion of the exfoliated graphite platelets in the rubber composition as evidenced by the resultant better heat conductivity property of the prepared rubber Samples E and F, for many purposes the dry masterbatching preparation of the exfoliated graphite platelets resulted in a good dispersion as evidenced by the increased heat conductivity of rubber Samples I and J.

This is, however, indicative of better dispersion of the exfoliated graphite platelets obtained by pre-wet masterbatching.

While various embodiments are disclosed herein for practicing the invention, it will be apparent to those skilled in this art that various changes and modifications may be made therein without departing from the spirit or scope of the invention.

What is claimed is:

1. A method of preparing a sulfur curable rubber composition is comprised of:

(A) preparing a masterbatch comprised of blending from about 3 to about 20 parts by weight of graphite platelets consisting of exfoliated graphite platelets with an organic solvent solution containing 100 parts by weight of at least one conjugated diene-based elastomer to form the masterbatch after which the masterbatch is dried by removing the organic solvent, wherein said diene-based elastomer consists of at least one of cis 1,4-polyisoprene, cis 1,4-polybutadiene and styrene/butadiene elastomer, (B) preparing a subsequent sulfur curable rubber composition comprised of blending with said masterbatch up to about 40 parts by weight of at least one additional conjugated diene-based elastomer, where said additional diene-based elastomer consists of at least one of

TABLE 4

|  | Control (phr) | | Experimental (phr) | | | |
| --- | --- | --- | --- | --- | --- | --- |
|  | A | G | E | F | I | J |
| Synthetic cis 1,4-polyisoprene | 100 | 100 | 0 | 0 | 0 | 0 |
| Masterbatches with exfoliated graphite | 0 | 0 | 115 | 120 | 125 | 125 |
| Cis 1,4-polyisoprene | 0 | 0 | 100 | 100 | 100 | 100 |
| Exfoliated graphite platelets | 0 | 0 | 15 | 20 | 25 | 25 |
| Carbon black (N205) | 20 | 40 | 0 | 0 | 0 | 20 |
| Properties | | | | | | |
| MDR test; 60 minutes at 150° C. | | | | | | |
| Maximum torque (dN-m) | 13.6 | 20.8 | 13.5 | 14.7 | 8.4 | 12.7 |
| Minimum torque (dN-m) | 1.8 | 2.7 | 0.5 | 0.6 | 1.1 | 1.6 |
| T25 (minutes) | 6 | 5 | 8 | 7.7 | 6.7 | 4.4 |
| T90 (minutes) | 10 | 9 | 12.3 | 12 | 12.8 | 10.3 |
| RPA test (Rubber Process Analyzer) | | | | | | |
| Uncured storage modulus G' (KPa) | 154 | 203 | 39 | 42 | 97 | 130 |
| At 10% strain, 11 Hertz, 100° C. | | | | | | |
| Storage modulus G' (KPa) | 907 | 1444 | 849 | 903 | 597 | 889 |
| Tan delta | 0.048 | 0.11 | 0.05 | 0.06 | 0.06 | 0.1 |
| Stress-strain | | | | | | |
| Tensile strength (MPa) | 21.2 | 22.7 | 14.6 | 15.3 | 7.8 | 14.1 |
| Elongation at break (%) | 558 | 478 | 418 | 490 | 647 | 545 |
| 100% modulus (MPa) | 1.5 | 2.4 | 3.1 | 3.8 | 1.6 | 3 |
| 300% modulus, ring, (MPa) | 6.4 | 12 | 5.3 | 6.4 | 3.0 | 6.3 |
| Thermal conductivity (W/m/K)[1] | 0.2 | 0.24 | 0.63 | 0.8 | 0.59 | 0.69 |

The tests were the same as used for Table 3.

It can be seen from Table 4 that the thermal conductivity for pre-wet masterbatch prepared Experimental rubber Samples E and F using 15 and 20 phr of exfoliated graphite platelets, respectively, was significantly greater than the thermal conductivity obtained for the pre-dry masterbatch prepared Experimental rubber Samples I and J.

cis 1,4-polyisoprene, cis 1,4-polybutadiene and styrene/butadiene elastomer, and from about 20 to about 120 parts by weight of reinforcing filler per 100 parts by weight of the total of said conjugated diene-based elastomer(s) comprised of a combination of rubber reinforcing carbon black and precipitated silica together with a coupling agent for said precipitated silica having a moiety reactive with hydroxyl groups on said precipitated silica and another different moiety interactive with said conjugated diene-based elastomer(s), and (C) processing said prepared sulfur curable rubber composition by at least one of extrusion, calendaring, and milling to provide a rubber composition containing a dispersion of said graphite platelets in parallel alignment with each other.

2. The method of claim 1 wherein said rubber composition is sulfur cured.

3. The method of claim 1 wherein said rubber composition is used for a tire having a component.

* * * * *